United States Patent [19]
De Trana et al.

[11] Patent Number: 6,078,659
[45] Date of Patent: Jun. 20, 2000

[54] APPARATUS AND METHOD FOR FAST AUTOMATED RECOVERY FROM TOLL SWITCH FAILURE IN A TELEPHONE NETWORK

[75] Inventors: Nicholas D. De Trana, Addison; Craig L. DeCaluwe, Naperville, both of Ill.; William Charles Leach, Glen Gardner, N.J.

[73] Assignee: AT&T Corp., New York, N.Y.

[21] Appl. No.: 09/163,223

[22] Filed: Sep. 29, 1998

[51] Int. Cl.[7] ........................................ H04M 7/00
[52] U.S. Cl. ........................ 379/221; 379/220; 379/222
[58] Field of Search ................................. 379/220, 221, 379/222, 207, 201

[56] References Cited

U.S. PATENT DOCUMENTS

| | | | |
|---|---|---|---|
| 5,146,452 | 9/1992 | Pekarske | 379/221 X |
| 5,222,128 | 6/1993 | Daly et al. | 379/221 |
| 5,465,294 | 11/1995 | Chapman, Sr. et al. | 379/221 X |
| 5,838,769 | 11/1998 | McNeil et al. | 379/220 X |
| 5,850,505 | 12/1998 | Grover et al. | 379/221 X |

*Primary Examiner*—Creighton Smith

[57] ABSTRACT

The present invention provides an efficient recovery mechanism when a toll switch within a telephone network is inoperative. A telephone network management operating system and a network manager determines that a toll switch is sufficiently inoperative and invokes a trunk group reconfiguration mechanism. A cross connect system, such as a DCS (Digital Cross-connect System), links the toll-completing trunk groups coming into such an inoperative toll switch to intertoll trunk groups coming into such a toll switch. In this manner, an alternative toll switch within the telephone network replaces the inoperative toll switch for such toll-completing trunk groups thereby restoring operation to customers previously tied to the inoperative toll switch in an efficient and low-cost manner by using already existing components within the telephone network. In addition, the telephone network management operating system within the telephone network ensures that calls that previously would have been routed through that failed toll switch are now routed through the alternative toll switch.

15 Claims, 4 Drawing Sheets

APPARATUS AND METHOD FOR FAST AUTOMATED RECOVERY FROM TOLL SWITCH FAILURE IN A TELEPHONE NETWORK

TECHNICAL FIELD

This invention relates to telephone networks, and more particularly, to an apparatus and method for efficiently restoring operation to the telephone network when a toll switch within the telephone network is inoperative.

BACKGROUND OF THE INVENTION

A telephone network includes a hierarchy of switches for establishing a voice-data transmission path between a caller and a called party. Each party's telephone within a local area is coupled to a local switch. A plurality of local switches, encompassed within a larger area, are coupled to a toll switch. A plurality of such toll switches are then coupled to each other to provide connectivity between any two parties within a telephone system.

For example, referring to FIG. 1, basic components of a telephone network 100 for establishing such a voice-data transmission path include a caller telephone 102 coupled to a first local switch 104. The first local switch 104 is coupled to a first toll switch 106 via a first DCS (Digital Cross-connect System) 108. A called telephone 112 is similarly coupled to a second local switch 114. The second local switch 114 is coupled to a second toll switch 116 via a second DCS (Digital Cross-connect System) 118.

When the caller telephone 102 calls up the called telephone 112, a voice-data transmission path is established from the caller telephone 102 through the first local switch 104, through the first DCS 108, through the first toll switch 106, back through the first DCS 108, through the second DCS 118, through the second toll switch 116, back through the second DCS 118, through the second local switch 114, and finally to the called telephone 112.

A DCS (Digital Cross-connect System) has a plurality of local switches and a plurality of toll switches coupled thereto, and couples an appropriate local switch to an appropriate toll switch in establishing the voice-data transmission path. A local switch is coupled to a DCS via a toll-completing trunk group. A toll-completing trunk group is typically comprised of a plurality of toll-completing trunks as known to one of ordinary skill in the art of telephony. In FIG. 1, the first local switch 104 is coupled to the first DCS 108 via a first toll-completing trunk group 120. The second local switch 114 is coupled to the second DCS 118 via a second toll-completing trunk group 122. The toll switches are coupled to each other via an intertoll trunk group 124. An intertoll trunk group is typically comprised of a plurality of intertoll trunks as known to one of ordinary skill in the art of telephony. The intertoll trunk group 124 is coupled between the first DCS 108 and the second DCS 118.

Control data is used in inquiring about the availability of a voice-data transmission path. Such control data is sent to query the switches 104, 106, 114, and 116 regarding such availability. An STP (Signal Transfer Point) is coupled to each switch for receiving and transmitting such control data for each respective switch. In FIG. 1, a first STP (Signal Transfer Point) 130 is coupled to the first local switch 104, a second STP (Signal Transfer Point) 132 is coupled to the first toll switch 106, a third STP (Signal Transfer Point) 134 is coupled to the second local switch 114, and a fourth STP (Signal Transfer Point) 136 is coupled to the second toll switch 116. (Note, two STP's are coupled to each switch in a robust telephone network For example, the AT&T telephone network includes two STPs for each switch. However, it should be apparent to one of ordinary skill in the art that the present invention is not dependent on the STP configuration. Nevertheless, one STP per switch is shown in FIG. 1 for clarity of illustration.)

Referring to FIG. 2, a toll switch is coupled to a plurality of other toll switches and a plurality of local switches. As an example illustration, a predetermined toll switch 202 is coupled to a first local switch 204, a second local switch 206, and a third local switch 208, and switches a phone call originating or terminating in any of such local switches. The predetermined toll switch 202 is also coupled to a first toll switch 210 (which in turn is coupled to a fourth local switch 211), a second toll switch 212 (which in turn is coupled to a fifth local switch 213), and a third toll switch 214 (which in turn is coupled to a sixth local switch 215).

In the prior art telephone network, if any toll switch in the telephone network, such as the predetermined toll switch 202 were to fail, a spare toll switch 220 is at hand to take the place of the inoperative toll switch 202. A first broadcast satellite T/R (Transponder/Responder) 222 is coupled to the local switches 204, 206, and 208 that are coupled to the inoperative toll switch 202. The first broadcast satellite T/R 222 broadcasts data from these local switches 204, 206, and 208 to the spare toll switch 220, via a second broadcast satellite T/R (transponder/responder) 224. The second broadcast satellite T/R 224 also broadcasts data from the spare toll switch 220 to the local switches 204, 206, and 208.

This prior art technology for restoring operation to the telephone network in the event of a toll switch failure is cumbersome and costly. The spare toll switch 220, and the first and second broadcast satellite T/Rs 222 and 224 may be relatively costly to maintain, implement, and operate. Furthermore, connections between the numerous local switches to the first broadcast satellite T/R 222 via transmission facilities 226 and between the numerous toll switches to the spare toll switch 220 via additional transmission facilities 228 require additional costs. Moreover, the additional transmission facilities 228 from the toll switches 210, 212, and 214 to the spare toll switch 220 are typically utilized to full capacity only in the event of a failure at a toll switch. Furthermore, restoring operation to the telephone network by verifying proper operation of the spare toll switch 220 and the first and second broadcast satellite T/Rs 222 and 224 may be time-consuming.

Thus, a relatively more efficient and less-costly apparatus and method for handling a failure of a toll switch within a telephone network is desired.

SUMMARY OF THE INVENTION

Accordingly, a primary object of the present invention is to utilize already existing components within a telephone network in restoring operation to the telephone network in the event of a toll switch failure in the telephone network. More specifically, the present invention links the toll-completing trunk groups coming into the inoperative toll switch to other toll switches which then act in place of the failed toll switch.

In a general aspect, a method and apparatus of the present invention handles failure of a predetermined toll switch within a telephone network. The predetermined toll switch is coupled to a cross connect system. The present invention within the telephone network determines that the predetermined toll switch is sufficiently inoperative to be replaced by at least one other toll switch within the telephone network.

The present invention also determines a mapping between at least one toll-completing trunk of a toll-completing trunk group, coupled to the predetermined toll switch and to the cross connect system, and at least one intertoll trunk group, coupled to the cross connect system. That cross connect system links each of the at least one toll-completing trunk to a respective intertoll trunk group according to the mapping when the predetermined toll switch is sufficiently inoperative. Furthermore, each intertoll trunk group is coupled to a respective alternative toll switch that replaces the predetermined toll switch for each of the at least one toll-completing trunk in each toll-completing trunk group.

The present invention can be used to particular advantage when the toll switches within the telephone network are notified of the coupling of each of the at least one toll-completing trunk to the respective intertoll trunk group when the predetermined toll switch is sufficiently inoperative. In that case, each toll-completing trunk group, which is coupled to a respective local switch, routes calls originating or terminating at the respective local switch through an alternative toll switch.

By thus utilizing already available components within the telephone network, operation of the telephone network is restored in a relatively low-cost, efficient, and quick manner. Furthermore, the restoration of operation to the telephone network may be achieved remotely from the failed toll switch and without sending equipment and personnel to the failed toll switch.

These and other features and advantages of the present invention will be better understood by considering the following detailed description of the invention which is presented with the attached drawings.

BRIEF DESCRIPTION OF THE DRAWING

The figures referred to herein are drawn for clarity of illustration and are not necessarily drawn to scale. Moreover, elements having the same reference number in FIGS. 1–4 refer to elements having similar structure and function.

DETAILED DESCRIPTION

Figure 1:
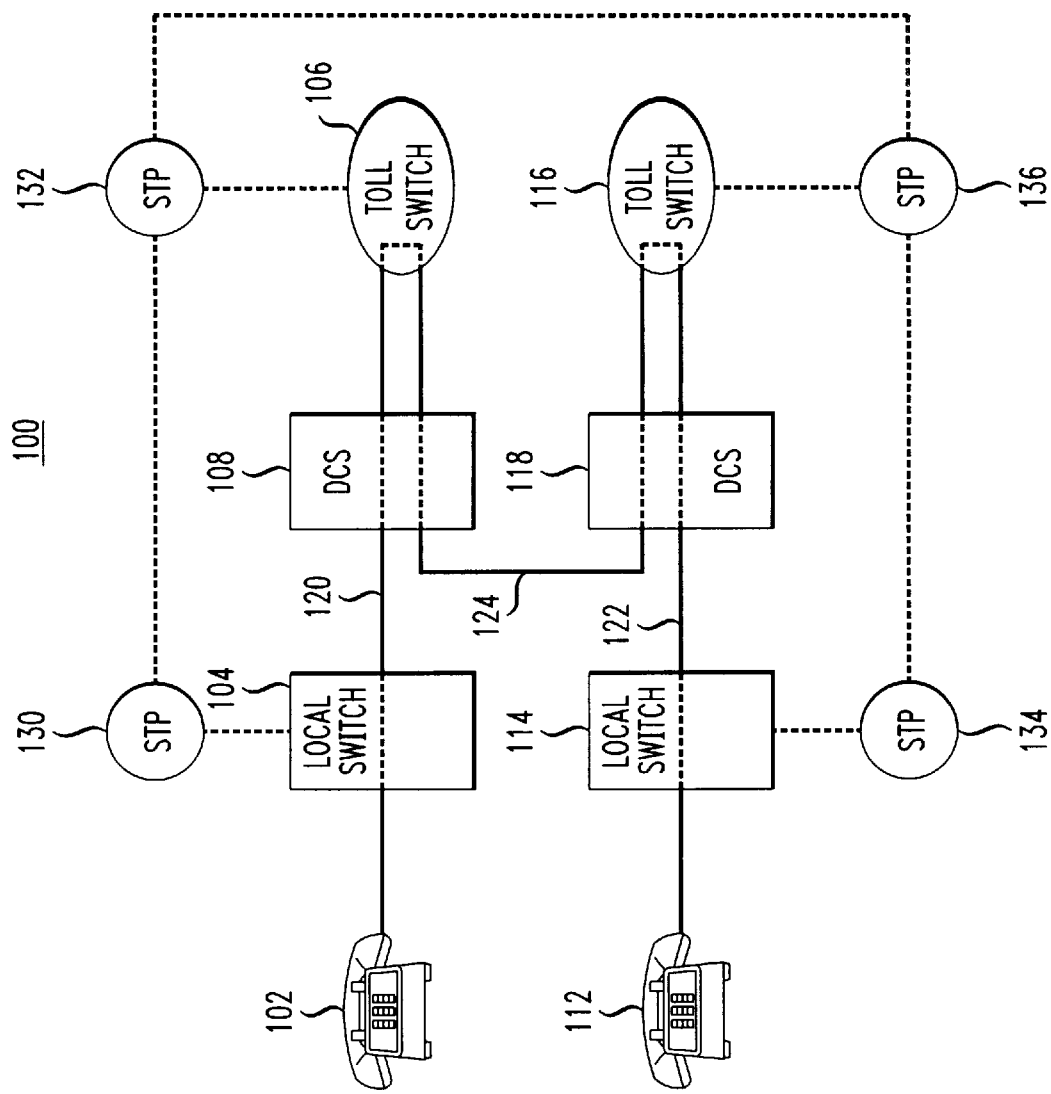
FIG. 1 shows basic components of a telephone network for establishing a voice-data transmission path in the telephone network.
Figure 2:
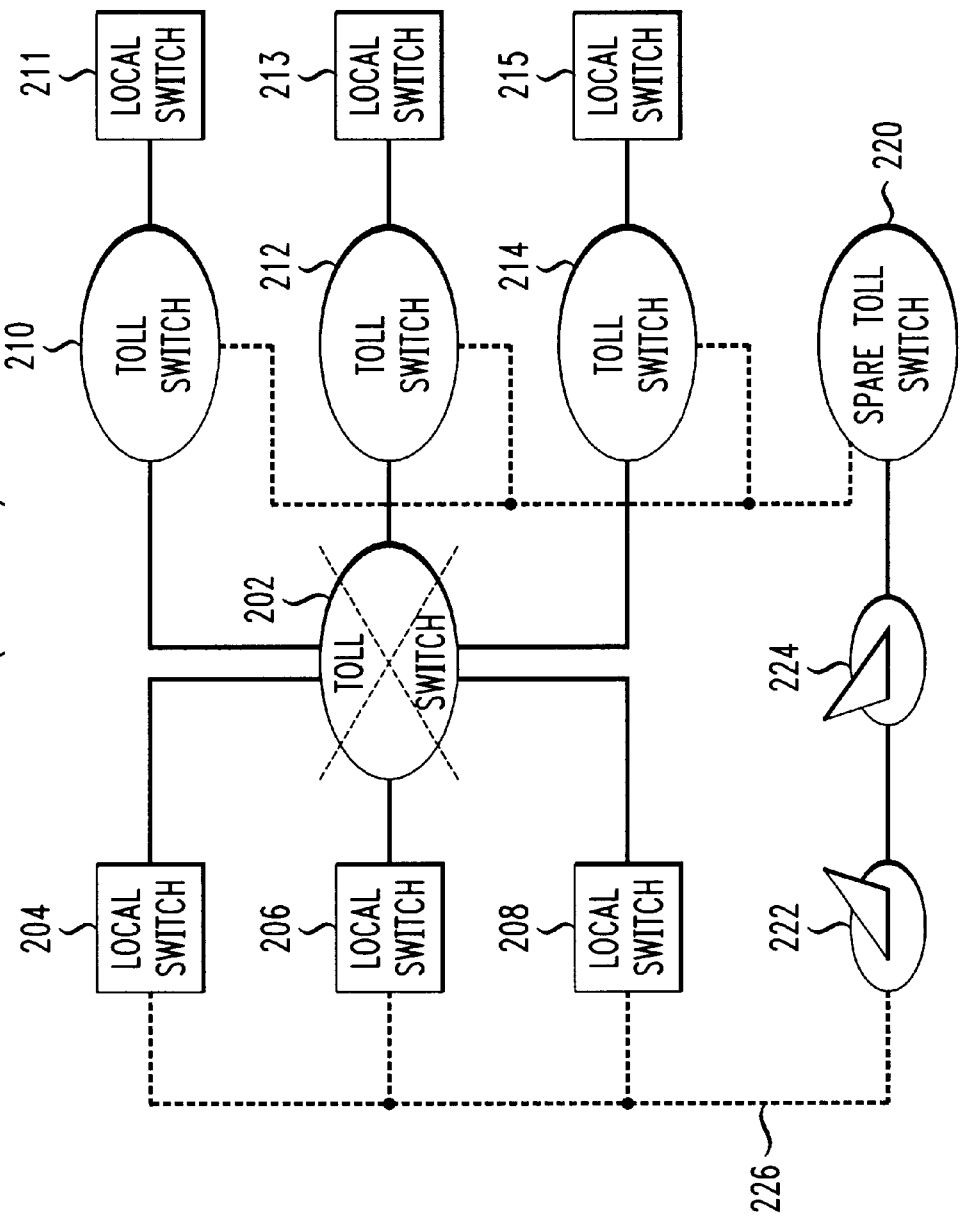
FIG. 2 shows the prior art components for restoring operation to a telephone network in the event of a toll switch failure.
Figure 3:
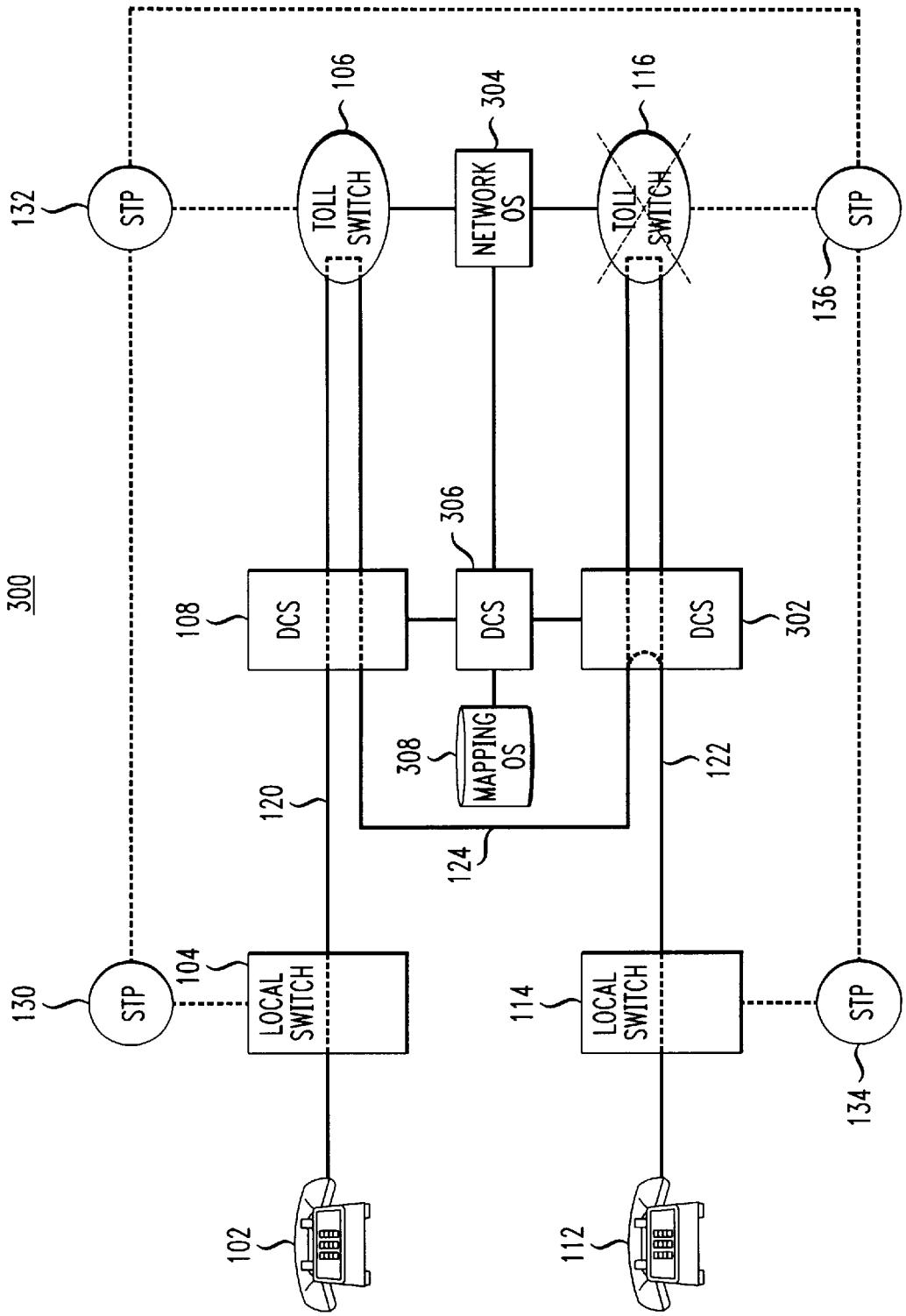
FIG. 3 shows mapping of an intertoll trunk group to a toll-completing trunk group for restoring operation to a telephone network in the event of a toll switch failure, according to an embodiment of the present invention.

Referring to FIG. 3, a telephone network 300 of the present invention includes components having same reference numbers as components of FIG. 1 that are similar in structure and function. However in FIG. 3, the second toll switch 116 has failed and is no longer operative.

A network management OS (Operating System) 304 is coupled to the toll switches 106 and 116 (and other toll switches not shown in FIG. 3) within the telephone network 300 and detects that the second toll switch 116 is inoperative. The network management OS 304 monitors and controls the toll switches for proper operation. Operating systems are typically comprised of a computer or a network of computers and are common in telephone networks for aiding proper operation of the telephone network. For example, the network management OS 304 monitors the available switching capacity through each trunk group and may apply controls at each toll switch to optimize call routing from a calling party to a called party within the telephone network.

Upon determination by the network management OS 304 that the second toll switch 116 is inoperative, the network management OS 304 informs a network manager. The network manager then makes further inquiries and determines whether to invoke the reconfiguration of toll-completing trunks to the intertoll trunks within a remapping DCS 302. The network manager determines whether the second toll switch 116 is sufficiently inoperative such that this reconfiguration is worthwhile for restoring service to the local switches that were previously being serviced by the now inoperative toll switch 116. Factors that are considered in making this determination may include the extent of non-service to the local switches coupled to the inoperative toll switch 116 or the estimated time for restoring operation to the failed toll switch 116.

In an alternative embodiment of the present invention, the network management OS 304 may automatically make this determination. However, human determination by a network manager may be preferable for consideration of unforeseeable factors in making such a determination. For example, if the inoperative toll switch 116 is in a recovery phase whereby the inoperative toll switch 116 will be restored to proper operation within a short time (typically within minutes), the network manager may decide not to invoke the reconfiguration of toll-completing trunks to the intertoll trunks.

When the network manager determines that the second toll switch 116 is sufficiently inoperative, the network manager sends a control signal from the network management OS 304 to a DCS (Digital Cross-connect System) OS (Operating System) 306. The DCS OS 306 monitors and controls the operation of the DCS 108 and 302 within the telephone network 300. The network management OS 304 invokes the DCS OS 306 to control the remapping within the DCS 302 to couple the second local switch 114 to another toll switch, (i.e., the first toll switch 106 in FIG. 3).

The DCS 302 is coupled to other local switches (aside from just the second local switch 114) via other toll-completing trunk groups (aside from just the second toll-completing trunk group 122). Furthermore, the DCS 302 is coupled to other toll switches (aside from just the first toll switch 106) via other intertoll trunk groups (aside from just the intertoll trunk group 124). (Note that these other toll-completing trunk groups and intertoll trunk groups are not shown in FIG. 3 for clarity of illustration.)

When the network management OS 304 is informed that the second toll switch 116 is sufficiently inoperative, the DCS 302 links at least one toll-completing trunk of each toll-completing trunk group (coupled to the DCS 302) with a respective intertoll trunk group (coupled to the DCS 302). Which toll-completing trunk of which toll-completing trunk group should be linked with which intertoll trunk group may be determined by a mapping OS (Operating System) 308. The mapping OS 308 includes a database which keeps track of the toll-completing trunk groups and the intertoll trunk groups coupled to each DCS within the telephone network 300.

Furthermore, the mapping OS 308 keeps track of which toll-completing trunk of a toll-completing trunk group should be linked to which intertoll trunk group depending on various factors such as the size of the linked trunk groups. The DCS OS 306 then instructs the DCS 302 to link at least one toll-completing trunk of each toll-completing trunk group to the appropriate intertoll trunk group as determined by the mapping OS 308. Referring to the example of FIG. 3, at least one toll-completing trunk of the second toll-completing trunk group 122 is linked to the intertoll trunk group 124.

Additionally, each intertoll trunk group, that is thus linked to a respective toll-completing trunk, is coupled to a respective alternative toll switch that replaces the inoperative toll switch 116 for each of the toll-completing trunks that are linked to that intertoll trunk group. Referring to FIG. 3, the intertoll trunk group 124 is coupled to the first toll switch 106. In this manner, the first toll switch 106 is the respective alternative toll switch that takes the place of the second toll switch 116 that is now inoperative. Furthermore, the intertoll trunk group 124 becomes a toll-completing trunk group from the second local switch 114 as the second toll-completing trunk group 122 is mapped to the intertoll trunk group 124 by the remapping DCS 302.

The first toll switch 106 acts as the respective alternative toll switch and replaces the inoperative toll switch 116 for the toll-completing trunk group 122 and thus for calls originating or terminating from the second local switch 114. The rest of the telephone network 300 is then instructed to route calls originating or terminating in the second local switch 114 via the first toll switch 106 (instead of via the inoperative second toll switch 116).

After the linking of the toll-completing trunk groups to the intertoll trunk groups, the network management OS 304 controls the other toll switches within the telephone network 300 to route calls terminating in the local switch 114 (or any other local switches coupled to the inoperative toll switch 116) via the respective alternative toll switch (i.e. the first toll switch 106) in FIG. 3. The network management OS 304 maintains a link to a routing OS (Operating System) for controlling routing for a phone call, as known to one of ordinary skill in the art of telephony. In the present invention, the network management OS 304 instruct the routing OS to replace the inoperative toll switch 116 with the respective alternative toll switch 106 for calls destined to or originated from the local switch 114.

In addition, the respective STP (Signal Transfer Points) for each local switch that is coupled to the inoperative toll switch 116 is also reconfigured to send STP control signals to the respective alternative toll switch instead of the inoperative toll switch 116. A STP recognizes the source and destination of control signals by using a respective point code address assigned to each toll switch. The respective STP (Signal Transfer Points) for each local switch that is coupled to the inoperative toll switch 116 is reconfigured with a translation of the respective point code address for the inoperative toll switch 116 to the respective point code address for the alternative toll switch. Referring to FIG. 3 for example, the third STP 134, coupled to the second local switch 114, is reconfigured to translate the respective point code address of the inoperative second toll switch 116 to the respective point code address of the alternative first toll switch 106 for all calls to and from the second local switch 114.

Alternatively, a STP coupled to the inoperative toll switch 116 is also reconfigured to send STP control signals to the respective alternative toll switch instead of the inoperative toll switch 116 for calls to and from the second local switch 114. The STP coupled to the inoperative toll switch 116 is reconfigured to change the respective point code address for the inoperative toll switch 116 to the respective point code address for the alternative toll switch based on an originating point code address. Referring to FIG. 3 for example, the fourth STP 136, coupled to the inoperative toll switch 116, is reconfigured to translate the respective point code address of the inoperative second toll switch 116 to the respective point code address of the alternative first toll switch 106 for codes originated from the second local switch 114.

A limited number of local switches and toll switches are illustrated in the telephone network 300 of FIG. 3 for clarity of illustration. However, one of ordinary skill in the art of telephone networks should appreciate that the present invention may be practiced with any number of local switches coupled via any number of toll-completing trunk groups to the inoperative toll switch and with any number of toll switches within the telephone network 300.

Figure 4:
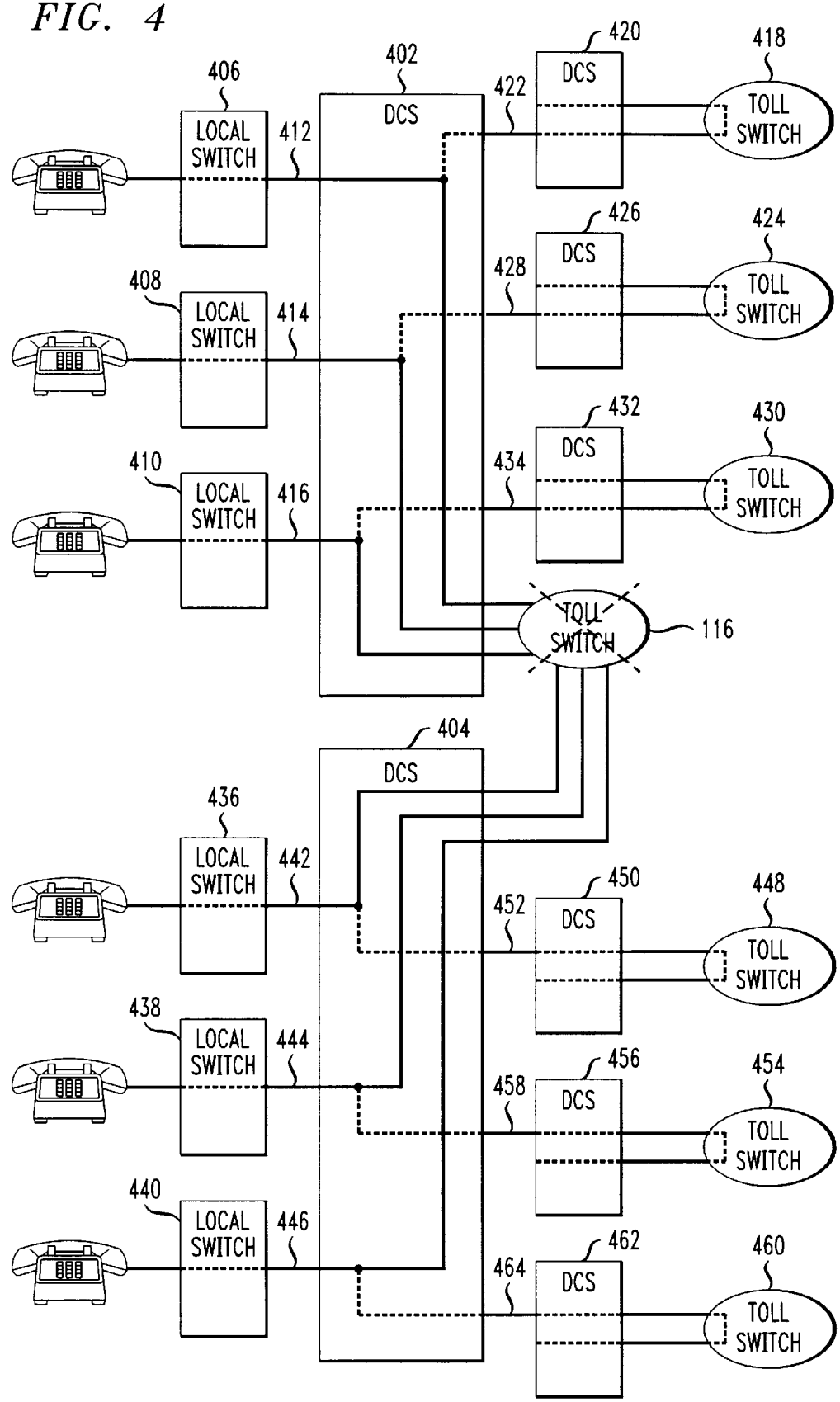
FIG. 4 shows mapping of multiple intertoll trunk groups to multiple toll-completing trunk groups, according to an embodiment of the present invention.

For example, referring to FIG. 4, a first remapping DCS (Digital Cross-connect System) 402 and a second remapping DCS (Digital Cross-connect System) 404 are coupled to the second toll switch 116 that is inoperative. A third local switch 406, a fourth local switch 408 and a fifth local switch 410 are coupled to the first remapping DCS 402 via a third toll-completing trunk group 412, a fourth toll-completing trunk group 414, and a fifth toll-completing trunk group 416, respectively.

Additionally, a third toll switch 418 with a corresponding third DCS (Digital Cross-connect System) 420 is coupled to the first remapping DCS 402 via a third intertoll trunk group 422. A fourth toll switch 424 with a corresponding fourth DCS (Digital Cross-connect System) 426 is coupled to the first remapping DCS 402 via a fourth intertoll trunk group 428. A fifth toll switch 430 with a corresponding fifth DCS (Digital Cross-connect System) 432 is coupled to the first remapping DCS 402 via a fifth intertoll trunk group 434.

The first remapping DCS 402 links the third toll-completing trunk group 412 to the third intertoll trunk group 422, the fourth toll-completing trunk group 414 to the fourth intertoll trunk group 428, and the fifth toll-completing trunk group 416 to the fifth intertoll trunk group 434. For example, the first remapping DCS 402 includes switches for making such connections between the trunk groups. In this manner, the third toll switch 418 takes the place of the inoperative second toll switch 116 for phone calls originating or terminating in the third local switch 406. The fourth toll switch 424 takes the place of the inoperative second toll switch 116 for phone calls originating or terminating in the fourth local switch 408. The fifth toll switch 430 takes the place of the inoperative second toll switch 116 for phone calls originating or terminating in the fifth local switch 410.

Moreover, a sixth local switch 436, a seventh local switch 438 and an eighth local switch 440 are coupled to the second remapping DCS 404 via a sixth toll-completing trunk group 442, a seventh toll-completing trunk group 444, and an eighth toll-completing group 446, respectively. Additionally, a sixth toll switch 448 with a corresponding sixth DCS (Digital Cross-connect System) 450 is coupled to the second remapping DCS 404 via a sixth intertoll trunk group 452. A seventh toll switch 454 with a corresponding seventh DCS (Digital Cross-connect System) 456 is coupled to the second remapping DCS 404 via a seventh intertoll trunk group 458. An eighth toll switch 460 with a corresponding eighth DCS (Digital Cross-connect System) 462 is coupled to the second remapping DCS 404 via an eighth intertoll trunk group 464.

The second remapping DCS 404 maps the sixth toll-completing trunk group 442 to the sixth intertoll trunk group 452, the seventh toll-completing trunk group 444 to the seventh intertoll trunk group 458, and the eighth toll-completing trunk group 446 to the eighth intertoll trunk group 464. For example, the second remapping DCS 404 may include switches for making such connections between the trunk groups. In this manner, the sixth toll switch 448 takes the place of the inoperative second toll switch 116 for phone calls originating or terminating in the fifth local switch 436. The seventh toll switch 454 takes the place of the inoperative second toll switch 116 for phone calls originating or terminating in the seventh local switch 438. The eighth toll switch 460 takes the place of the inoperative second toll switch 116 for phone calls originating or terminating in the eighth local switch 440.

In a preferred embodiment of the present invention, the first remapping DCS 402 and the second remapping DCS 404 are disposed in a location that is separate and apart from the location of the second toll switch 116. For example, the first remapping DCS 402 and the second remapping DCS 404 may be located in a separate building from a building that houses the second toll switch 116. With such locations, if the building housing the second toll switch 116 were subject to a destructive condition such as burning down in a fire or an explosion, the first remapping DCS 402 and the second remapping DCS 404 which are housed in a separate building would not be subject to such destruction. Thus, the first remapping DCS 402 and the second remapping DCS 404 would still be available to map the toll-completing trunk groups to intertoll trunk groups to restore operation to the telephone network.

Additionally, the present invention may be used to particular advantage when the first remapping DCS 402 and the second remapping DCS 404 are housed separately from each other such that one DCS is still available in the event that the other DCS is subject to a destructive condition. For example, if the first remapping DCS 402 is housed in a first building and the second remapping DCS 404 is housed in a second building that is separate and apart from the first building, then the second remapping DCS 404 would remain operative even when the first building and the first remapping DCS 402 are destroyed. As a result, that portion of the local switches operatively coupled to the second toll switch 116 via the second remapping DCS 404 may still be serviced by the telephone network.

In this manner, another toll switch within the telephone network takes the place of a failed toll switch to continue service to the local switches that were coupled to the failed toll switch and to restore operation to the telephone network. By, preplanning for an event of a failure at any toll switch with the pre-existing components of the telephone network, operation of the telephone network may be restored within a relatively short period of time from a failure of a toll switch. In addition, by thus predominantly using already existing components of the telephone network, the present invention is a relatively low-cost solution for recovery from a failed toll switch.

The forgoing is by way of example only and is not intended to be limiting. For example, the DCS is one example of an remapping cross connect system that includes components for thus mapping toll-completing trunk groups with intertoll trunk groups. Also, the present invention may be practiced for any number of telephones served by any one local switch. In addition, the present invention may be practiced with variations in the number of toll-completing trunk groups that couple local switches to the DCS and the number of intertoll trunk groups that couple the toll switches to the DCS, aside from just the example illustration of FIG. 4. In addition, a plurality of toll-completing trunk groups may be mapped to an intertoll trunk group in the case a larger number of toll-completing trunk groups than the number of intertoll trunk groups are coupled to a DCS that services the inoperative toll switch. Generally, the present invention may be practiced with the toll-completing trunk groups being mapped to the intertoll trunk groups in any manner known to one of ordinary skill in the art of telephone switch design. The invention is limited only as defined in the following claims and equivalents thereof.

We claim:

1. A method for handling failure of a predetermined toll switch within a telephone network having a plurality of toll switches, each toll switch being coupled to a cross connect system via a respective intertoll trunk group, and the predetermined toll switch being coupled also to a toll-completing trunk group via the cross connect system, the method including the steps of:

A. determining that the predetermined toll switch is sufficiently inoperative to be replaced by an alternative toll switch of the plurality of toll switches within the telephone network;

B. determining a mapping between at least one toll-completing trunk, of said toll-completing trunk group, and the respective intertoll trunk group corresponding to said alternative toll switch; and C. linking within the cross connect system said at least one toll-completing trunk to said respective intertoll trunk group of said alternative toll switch according to said mapping such that said alternative toll switch replaces said predetermined toll switch when the predetermined toll switch is sufficiently inoperative.

2. The method of claim 1, further including the step of:

D. notifying said plurality of toll switches within the telephone network of the replacement with said alternative toll switch of said predetermined toll switch when the predetermined toll switch is sufficiently inoperative.

3. The method of claim 2, wherein said at least one toll-completing trunk is coupled to a respective local switch, the method further including the step of:

E. routing calls originating and terminating at the respective local switch through said alternative toll switch.

4. The method of claim 3, wherein a respective STP (Signal Transfer Point) is coupled to each local switch, and wherein step E further includes the step of:

reconfiguring the respective STP of the respective local switch with a point code address of said alternative toll switch instead of said predetermined toll switch that is sufficiently inoperative.

5. The method of claim 3, wherein an STP (Signal Transfer Point) is coupled to the predetermined toll switch that is inoperative, and wherein step E further includes the step of:

reconfiguring the STP coupled to the predetermined toll switch with a point code address of said alternative toll switch instead of the predetermined toll switch that is sufficiently inoperative.

6. The method of claim 1, wherein step A is performed within a network management operating system.

7. The method of claim 1, wherein step B is performed within a cross connect operating system.

8. A telephone network comprising:

a plurality of toll switches for defining voice-data transmission paths between a caller and a called party within the telephone network, wherein a predetermined toll switch of the plurality of toll switches is inoperative;

a respective STP (Signal Transfer Point) coupled to each of the toll switches and each of local switches within the telephone network, for sending call set up information used for setting up a voice-data transmission path between the caller and the called party;

a network management operating system, coupled to the plurality of toll switches, for invoking replacement of the predetermined toll switch with an alternative toll switch within the telephone network when the predetermined toll switch is sufficiently inoperative;

a cross connect system, coupled to each of the plurality of toll switches via a respective intertoll trunk group, the predetermined toll switch being coupled also to a toll-completing trunk group via the cross connect system;

a cross connect operating system, coupled to the network management operating system, for determining a mapping between at least one toll-completing trunk, of said toll-completing trunk group coupled to the predetermined toll switch, and the respective intertoll trunk group of said alternative toll switch; and wherein the cross connect system links the at least one toll-completing trunk to said respective intertoll trunk group corresponding to said alternative toll switch according to said mapping such that said alternative toll switch replaces said predetermined toll switch when the predetermined toll switch is inoperative.

9. The telephone network of claim 8, wherein the network management operating system notifies the toll switches within the telephone network of the replacement with said alternative toll switch of said predetermined tolls switch when the predetermined toll switch is sufficiently inoperative.

10. The telephone network of claim 9, wherein each of calls originating and calls terminating at a respective set of local switches coupled to the predetermined toll switch is routed through said alternative toll switch.

11. An apparatus for handling failure of a predetermined toll switch within a telephone network having a plurality of toll switches, each toll switch being coupled to a cross connect system via a respective intertoll trunk group, and the predetermined toll switch being coupled also to a toll-completing trunk group via the cross connect system, the apparatus comprising:

means for determining that the predetermined toll switch is sufficiently inoperative to be replaced by an alternative toll switch of the plurality of toll switches within the telephone network;

means for determining a mapping between at least one toll-completing trunk, of said toll-completing trunk group, and the respective intertoll trunk group corresponding to said alternative toll switch; and means for coupling within the cross connect said at least one toll-completing trunk to said respective intertoll trunk group of said alternative toll switch according to said mapping such that said alternative toll switch replaces said predetermined toll switch when the predetermined toll switch is sufficiently inoperative.

12. The apparatus of claim 11, the apparatus further comprising:

means for notifying the plurality of toll switches within the telephone network of the replacement with said alternative toll switch of said predetermined toll switch when the predetermined toll switch is sufficiently inoperative.

13. The apparatus of claim 11, wherein the toll-completing trunk group is coupled to a respective local switch, the apparatus further comprising:

means for routing calls originating from and terminating at the respective local switch through said alternative toll switch.

14. The apparatus of claim 13, wherein a respective STP (Signal Transfer Point) is coupled to each respective local switch, the apparatus further comprising:

means for reconfiguring the respective STP of each local switch with a point code address of said alternative toll switch instead of said predetermined toll switch that is sufficiently inoperative.

15. The apparatus of claim 13, wherein a STP (Signal Transfer Point) is coupled to the predetermined toll switch, further comprising:

means for reconfiguring the STP coupled to the predetermined toll switch with a point code address of said alternative toll switch instead of said predetermined toll switch that is sufficiently inoperative, based on an originating point code of the respective local switch.

* * * * *